(12) United States Patent
Ramm et al.

(10) Patent No.: US 10,746,131 B2
(45) Date of Patent: Aug. 18, 2020

(54) TURBINE MODULE FOR A TURBOMACHINE

(71) Applicant: MTU Aero Engines AG, München (DE)

(72) Inventors: Guenter Ramm, Eichenau (DE); Martin Hoeger, Erding (DE); Irene Raab, Munich (DE); Yavuz Guendogdu, Ismaning (DE)

(73) Assignee: MTU Aero Engines AG, Munich (DE)

( * ) Notice: Subject to any disclaimer, the term of this patent is extended or adjusted under 35 U.S.C. 154(b) by 69 days.

(21) Appl. No.: 16/219,323

(22) Filed: Dec. 13, 2018

(65) Prior Publication Data

US 2019/0186417 A1   Jun. 20, 2019

(30) Foreign Application Priority Data

Dec. 14, 2017   (DE) .................. 10 2017 222 817

(51) Int. Cl.
| | |
|---|---|
| *F01D 5/14* | (2006.01) |
| *F02K 3/06* | (2006.01) |
| *F01D 9/04* | (2006.01) |
| *F01D 9/06* | (2006.01) |
| *F01D 25/24* | (2006.01) |

(52) U.S. Cl.
CPC ............ *F02K 3/06* (2013.01); *F01D 5/142* (2013.01); *F01D 5/143* (2013.01); *F01D 5/146* (2013.01); *F01D 9/041* (2013.01); *F01D 9/06* (2013.01); *F01D 9/065* (2013.01); *F01D 25/24* (2013.01); *F05D 2240/12* (2013.01); *F05D 2240/14* (2013.01); *F05D 2250/37* (2013.01)

(58) Field of Classification Search
None
See application file for complete search history.

(56) References Cited

U.S. PATENT DOCUMENTS

| | | |
|---|---|---|
| 2010/0272566 A1 | 10/2010 | Durocher et al. |
| 2013/0051996 A1 | 2/2013 | Hoeger et al. |
| 2015/0128562 A1 | 5/2015 | Kusuda et al. |

FOREIGN PATENT DOCUMENTS

| | | |
|---|---|---|
| DE | 2135286 A | 1/1973 |
| DE | 102004036594 A1 | 3/2006 |
| DE | 102006057063 B3 | 7/2008 |
| EP | 2806102 A1 | 11/2014 |
| EP | 2194232 B1 | 3/2015 |
| EP | 3032032 A1 | 6/2016 |
| EP | 3064706 A1 | 9/2016 |
| EP | 3121383 A1 | 1/2017 |

*Primary Examiner* — Michael Lebentritt
(74) *Attorney, Agent, or Firm* — Barlow, Josephs & Holmes, Ltd.

(57) ABSTRACT

The present invention relates to a turbine module for a turbomachine, comprising a first flow bypass structure and a second flow bypass structure, said flow bypass structures being arranged in a hot gas duct, which is bounded by the turbine module and is designed to convey a hot gas and, namely, being arranged in succession in relation to a longitudinal axis of the turbine module in a direction of rotation, wherein, in relation to the bypass flow in the hot gas duct, the flow bypass structures each have a leading edge, and, downstream thereto, a trailing edge, and the second flow bypass structure is provided as a deflecting blade, wherein the second flow bypass structure has a smaller profile thickness than the first flow bypass structure, and wherein the hot gas duct is enclosed by a radial width.

15 Claims, 3 Drawing Sheets

TURBINE MODULE FOR A TURBOMACHINE

BACKGROUND OF THE INVENTION

Technical Field

Figure 1:
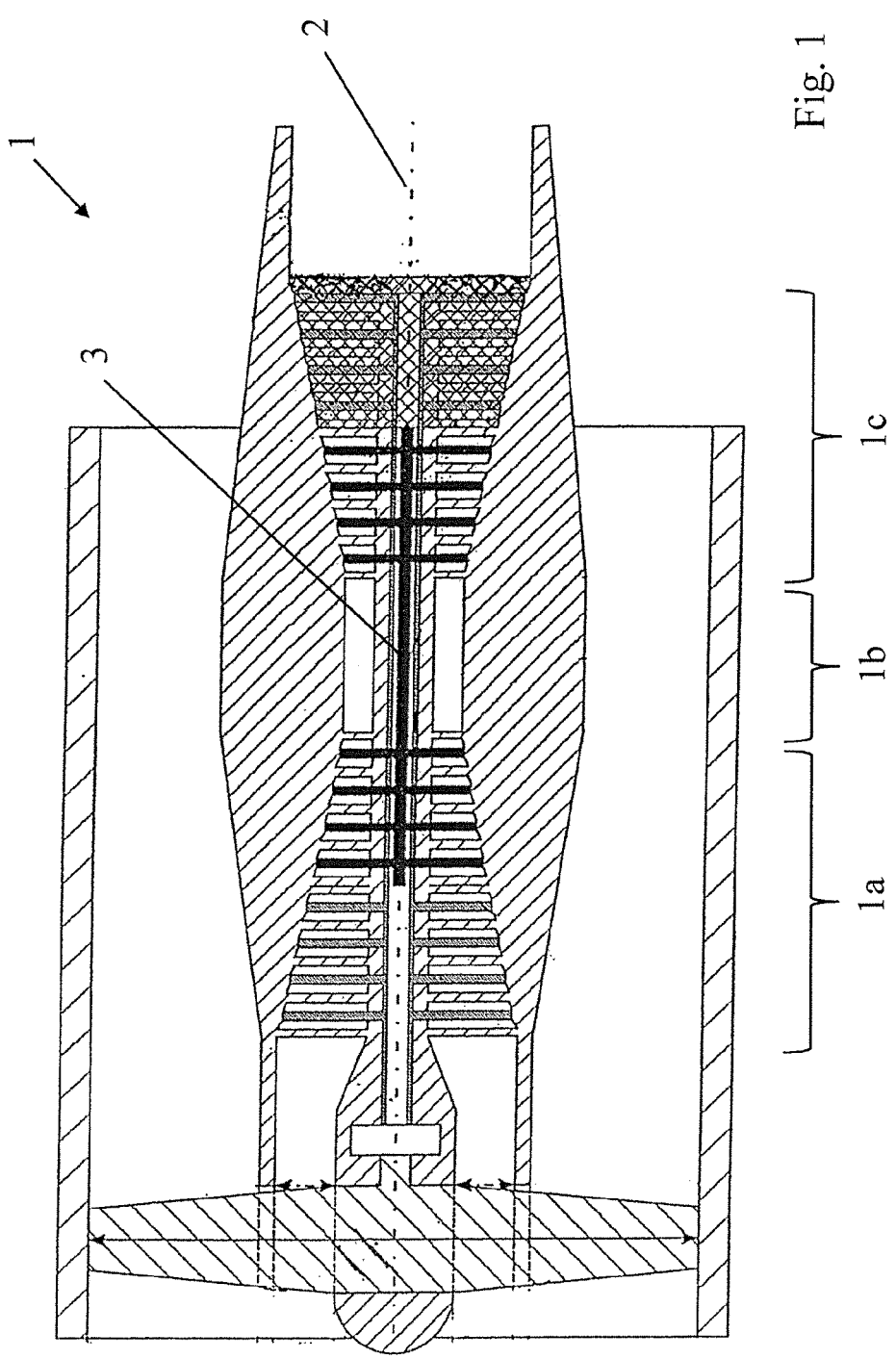

The present invention relates to a turbine module for a turbomachine with flow bypass structures for bypass flow in the hot gas duct.

Prior Art

The turbomachine can be, for example, a jet engine, such as, for example, a turbofan. Functionally, the turbomachine is divided into compressor, combustion chamber, and turbine. For instance, in the case of the jet engine, intake air is compressed by the compressor and combusted with admixed fuel in the downstream combustion chamber. The resulting hot gas, a mixture of combustion gas and air, flows through the downstream turbine and is thereby expanded. The hot gas flows through a volume along a path from the combustion chamber by way of the turbine to the nozzle, and, in the present case, a turbine module and thus a segment of this path or volume is initially taken into consideration. The part of the turbine module through which the hot gas flows is referred to as the "hot gas duct."

Therefore, on the one hand, the turbine module in question bounds the hot gas duct radially inward and radially outward. On the other hand, it has a plurality of flow bypass structures that are arranged in the hot gas duct. At least some of these flow bypass structures are formed as deflecting blades; others preferably involve support struts or corresponding claddings or fairings; the turbine module can be, in particular, a mid turbine frame. Like the above reference to a jet engine, this is intended to illustrate the present subject, but not to limit it initially in terms of its generality. The turbomachine can also be, for example, a stationary gas turbine or steam turbine.

SUMMARY OF THE INVENTION

The present invention is based on the technical problem of specifying an especially advantageous turbine module.

In accordance with the invention, this object is achieved with the turbine module according to the present invention. The turbine module has a first flow bypass structure and a second flow bypass structure, wherein the second flow bypass structure is provided as a deflecting blade and has a smaller profile thickness than the first flow bypass structure. The flow bypass structures are arranged circumferentially in succession to each other and therefore have at least a certain axial overlap. Accordingly, by means of the first flow bypass structure and the second flow bypass structure, flow bypass structures that, first of all, differ in terms of their type of design ("thick" and "thin, deflecting") and are provided for separate sections or stages that conventionally follow one another axially are combined in one module.

In this regard, this combination can be of advantage in that, as a rule, a relatively small number of first (thick) flow bypass structures are provided over the complete rotation. In accordance therewith, the hot gas would not be conveyed over relatively large divided regions. A first improvement in this regard is achieved with the second (thin) deflecting blades; namely, it is possible, for example, to adjust a uniform outflow angle. This can be of advantage, for example, in regard to the uniformity of the inflow to the downstream rotor. However, the inventors have found that, even in the case of a uniform outflow angle, it is still possible for nonuniformities in the Mach number or the mass flow to remain. Said nonuniformities can be addressed only conditionally through a change in the division (thick blade+one thin blade/a plurality of thin blades), for which reason, in accordance with the invention, the radial width of the hot gas duct is additionally varied. The variable duct width enables, for example, the mass flow near to the wall to be redistributed and made uniform. In graphic terms, the hot gas tends to flow in the direction of the largest free cross section, that is, to where the radial width is the greatest, as a result of which boundary layer convergences can be dissipated and nonuniformities can be prevented. An adjustment of the radial width makes it possible advantageously to increase the efficiency.

Advantageous embodiments are presented in the dependent claims and in the full description, whereby, in the presentation of the features, a distinction is not always made individually between the turbine module or the turbomachine or also corresponding applications or working methods. In any case, the disclosure is to be read implicitly in regard to all claim categories.

Each of the flow bypass structures has a leading edge and a trailing edge; two opposite-lying lateral surfaces of the respective flow bypass structure extend in between. The profile thickness is taken between the lateral surfaces. Specifically, in each case, the camber line between the leading edge and the trailing edge of the respective flow bypass structure extends in the middle between the lateral surfaces, and the profile thickness is then obtained as the largest circle diameter on the camber line (the circle contacts the lateral surfaces and its center point lies on the camber line). The thin deflecting blade can have, for example, a profile thickness that is at least 50%, 60%, 70%, or 80% smaller than that of the first flow bypass structure, with possible upper limits (independent thereof) at, for example, at most 99%, 97%, or 95% (respectively increasingly preferred in the sequence named).

Insofar as, in general, the flow bypass structures are compared to one another in the scope of this disclosure, the shaping of the respective structure is based on its respective radial center. What is therefore regarded in each case is the shape at half height (taken radially) of the corresponding flow bypass structure or of the deflecting blade or of the blade body. At the radial center of the gas duct, the influence on the flow can be the greatest. Preferably, however, the respective structures are nevertheless correspondingly shaped over their entire height relative to each other (in any case, when compared at a respective percentually equivalent height).

In general, in the scope of this disclosure, "axially" relates to the longitudinal axis of the turbine module and consequently, therefore, to the longitudinal axis of the turbomachine, which, for example, coincides with an axis of rotation of the rotors. "Radially" refers to radial directions that are perpendicular to said axis of rotation and are directed away from it, and a "rotation," "circumferentially," or the "direction of rotation" refer to the rotation around the longitudinal axis. "A" and "one" are to be read in the scope of this disclosure, unless explicitly stated otherwise, as an indefinite article and thus always also as "at least one." Insofar as the "radial width of the hot gas duct" is regarded, in particular the variations thereof, in this case, the flow bypass structures themselves are ignored; that is, the basis thereof is a hot gas duct that is (theoretically) free of the flow bypass structures.

Over a complete rotation, there are, as a rule, a plurality of first and second flow bypass structures in each case, which are each identical in construction to one another and are each arranged in a rotationally symmetrical manner. Furthermore, between two first (thick) flow bypass structures, it is preferably also possible for there to be yet further thin deflecting blades (third and fourth or even further flow bypass structures); refer also to the exemplary embodiment for illustration.

As already mentioned, the first flow bypass structure ("thick blade") is preferably provided as a bearing support strut or as a cladding, in particular as a cladding of a bearing support strut. "Support strut" means a bearing component part of the turbomachine; preferably, the support strut (jointly with other, circumferentially arranged support struts) supports the bearing of the turbine shaft, in particular of the high-pressure turbine shaft. The bearing is preferably arranged in the mid turbine frame. The support struts can each extend radially outward away from the bearing and, in this way, the bearing can be held in a spoke-like centered manner in the housing.

Preferably, the first flow bypass structure is a cladding, in which, for example, it is also possible to carry a supply line; preferably, it is a cladding of a support strut, and, therefore, it is placed at the actual bearing component for aerodynamic reasons. Such a cladding is also referred to as a fairing. The fairings have a relatively large division ratio (t/l) of 1 to 1.5. Over a complete rotation, it is possible to provide, for example, at least 6, 7, 8 to 9 fairings; possible upper limits lie at, for example, at most 20, 18, 16, or 15. The bearing function or the enclosure of the support strut necessitates a certain structural size, that is, a large profile thickness. This is a drawback aerodynamically, but is compensated at least partially by the combination with the thin deflecting blade. In general, the first flow bypass structure can also be provided in a non-deflecting manner; preferably, it is slightly deflecting at less than 5°, but has no effect on the flow (as a consequence of a change in radius and the principle of angular momentum, no impulse is transmitted onto the flow).

In a preferred embodiment, the radial width of the hot gas duct changes in the direction of rotation in terms of amount by at least 2%, preferably at least 3%. In this case, the percent change refers to a mean value of the radial width, which is taken at the same axial position over a complete rotation (360°). In contrast to this, the radial width should locally be at least 2% or 3% smaller or larger (this means "in terms of amount"). Advantageous upper limits, which, in general, can also be of interest independently of the lower limits and shall be disclosed, lie at, increasingly preferred in the order given, at most 8%, 7%, 6%, or 5% (in each case, in terms of amount, the radial width can also be correspondingly smaller or larger). Especially preferred, there can be a deviation of about 4%.

In a preferred embodiment, a housing wall surface, which bounds the hot gas duct radially outward, is formed with a radial protuberance and/or a radial depression; in each case, there are preferably a plurality of protuberances or depressions. At the housing wall surface, the influence of the rotor gap can bring about an underturning; through the shaping with protuberances/depressions, it is possible to avoid a boundary layer convergence. The extent to which a protuberance or depression is present here is determined by an "undisturbed" housing wall surface as a reference, which, as viewed in a sectional plane that is perpendicular to the longitudinal axis, is circular in shape at the same axial position (and has a radius that corresponds to the mean radius of the "disturbed" housing wall surface). The protuberances/depressions can extend longitudinally in the direction of the flow; that is, they can each have an elliptical shape.

In a preferred embodiment, a hub wall surface, which bounds the hot gas duct radially inward, is formed with a radial protuberance and/or depression, preferably a plurality of protuberances and/or depressions. At the hub wall surface, as a consequence of the duct vortex at the rotor hub of the high-pressure turbine, there occurs a multiple deflection or overturning; the protuberances/depressions there can prevent boundary layer convergences and blockades. The reference is, once again, a hub wall surface with an undisturbed course and the same (mean) radius. In general, a corresponding shaping of the hub wall surface can also be an alternative to a housing wall surface with a "disturbed" course (or vice versa); preferably, both measures are combined.

In general, the housing wall surface protrudes radially inward (toward the longitudinal axis) in the region of a radial protuberance, and, in the region of a depression, it moves back radially outward (away from the longitudinal axis). The hub wall surface protrudes radially outward in the region of a protuberance, and, in the region of a depression, moves back radially inward.

In a preferred embodiment, the radial width of the hot gas duct is larger at the suction side of the second (thin) flow bypass structure, which is formed as a deflecting blade, than at its pressure side. The free cross section is therefore reduced on the pressure side and/or is enlarged at the suction side (in comparison to the previously mentioned mean value), preferably both. The flow is thereby locally retarded (suction side) or accelerated (pressure side), as a result of which it is possible to prevent a boundary layer convergence and high resistances at the walls of the annular space.

In a preferred embodiment, which relates to a first flow bypass structure (thick blade) with a suction side and a pressure side, the radial width at the suction side is greater in a trailing edge region of the first flow bypass structure than at the pressure side of the first flow bypass structure. The suction side and pressure side of the first flow bypass structure ensue from the overall deflection.

In preferred embodiment, this trailing edge region lies between 70% and 100% of an axial length of the first flow bypass structure. Taken into consideration is the axial portion of its chord length, and, in fact, it is taken from upstream to downstream (0% for the leading edge, 100% for the trailing edge). Especially preferred, the trailing edge region, in which the radial width at the suction side is greater than at the pressure side, lies between 80% and 100% or between 85% and 100% of the axial length.

In a preferred embodiment, the first flow bypass structure is arranged at the suction side of the second flow bypass structure. The two flow bypass structures are circumferentially nearest neighbors to each other; the second (thin) flow bypass structure can generate a suction, for example, at the trailing edge of the aerodynamically more unfavorable, thick blade. It can thus accelerate the flow from there a bit further away, which can improve the outflow or make it uniform. Especially advantageously, this can be achieved when the trailing edge of the second flow bypass structure is displaced axially downstream with respect to that of the first flow bypass structure.

That part of the hot gas that flows between the first (thick) and the second (thin) flow bypass structure passes a first inflow region upstream (for which reason this part of the hot gas is also referred to as a "first part"). Between the flow bypass structures, the hot gas is enclosed on both sides (perpendicularly to the flow direction) by the flow bypass structures, and, in the inflow region, by no flow bypass structure or at most the first flow bypass structure (toward one side). In this inflow region, preferably the radial width of the hot gas duct is then greater at the pressure side wall of the first flow bypass structure (thick blade) than at the leading edge of the second flow bypass structure. For example, from a simulation of the pressure distributions, it may result that a corresponding adjustment of the widths leads to an advantageous redistribution or greater uniformity of the mass flow.

In a preferred embodiment, a third (thin) flow bypass structure is provided. The third flow bypass structure is then arranged at the pressure side of the second flow bypass structure, and the first flow bypass structure is arranged at the suction side of the second flow bypass structure. Preferably, an arrangement in which the leading edges of the thin flow bypass structure are increasingly axially displaced; that is, the leading edge of the third flow bypass structure is axially displaced downstream when compared with the leading edge of the second flow bypass structure. In general, a displacement of the trailing edges is also conceivable; preferably, the trailing edges of the thin flow bypass structures lie at the same axial height and the thin flow bypass structures then thus have a different axial length. The trailing edges of the thin flow bypass structures can be displaced axially downstream when compared with those of the first (thick) flow bypass structure, but they can also lie at the same axial height.

In a preferred embodiment, the radial width of the hot gas duct is greater at the suction side of the third flow bypass structure than at the pressure side thereof; preferably, it is smaller than a mean radial width at the suction side, and, at the same time, it is larger than a mean radial width at the pressure side.

Another advantageous embodiment relates to a second part of the hot gas, namely, the part that flows between the second flow bypass structure and the third flow bypass structure. Upstream, this second part of the hot gas passes a second inflow region, in which the hot gas is (not yet) enclosed relative to both sides by the second and the third flow bypass structures; compare also the preceding comments. In this second inflow region, the radial width of the hot gas duct is preferably reduced; it is therefore smaller than a mean value formed at the same axial position over a complete rotation.

In a preferred embodiment, a fourth flow bypass structure is provided, which is configured as a deflecting blade with a suction side and a pressure side. Said fourth flow bypass structure is provided at the pressure side of the third flow bypass structure and therefore, at the pressure side of the first, thick flow bypass structure, there follows, first of all, the second (thin) flow bypass structure, then the third (thin) flow bypass structure, and, finally, the fourth (thin) flow bypass structure. Preferably, the flow bypass structures are each displaced with their leading edge increasingly downstream (increasingly in the named sequence). Preferably, the hot gas duct is adjusted, once again, such that the radial width at the suction side of the fourth flow bypass structure is larger than at the pressure side.

An advantageous embodiment relates to that part of the hot gas that flows between the third flow bypass structure and the fourth flow bypass structure and is referred to as the "third part." Upstream, this third part of the hot gas passes a third inflow region, in which the hot gas is (not yet) enclosed relative to both sides by the flow bypass structures. In this third inflow region, the radial width of the hot gas duct is preferably reduced, and is therefore smaller than a mean value formed at the same axial position over the complete rotation.

The invention also relates to a turbomachine with a presently described turbine module, in particular a jet engine. The turbine module can preferably be a mid turbine frame; see above.

The invention also relates to a method for operating a presently described turbine module or a corresponding turbomachine, in which the hot gas flows through the hot gas duct. The hot gas, in particular a first part of the hot gas, can then flow through the first inflow region (see above) and/or a second part can flow through the second inflow region or a third part can flow through the third inflow region.

BRIEF DESCRIPTION OF THE DRAWING FIGURES

The invention will be described below in detail on the basis of exemplary embodiments, wherein the individual features in the scope of the independent claims may also be essential to the invention in other combinations, and also no distinction is made in detail between the different claim categories.

Figure 2:
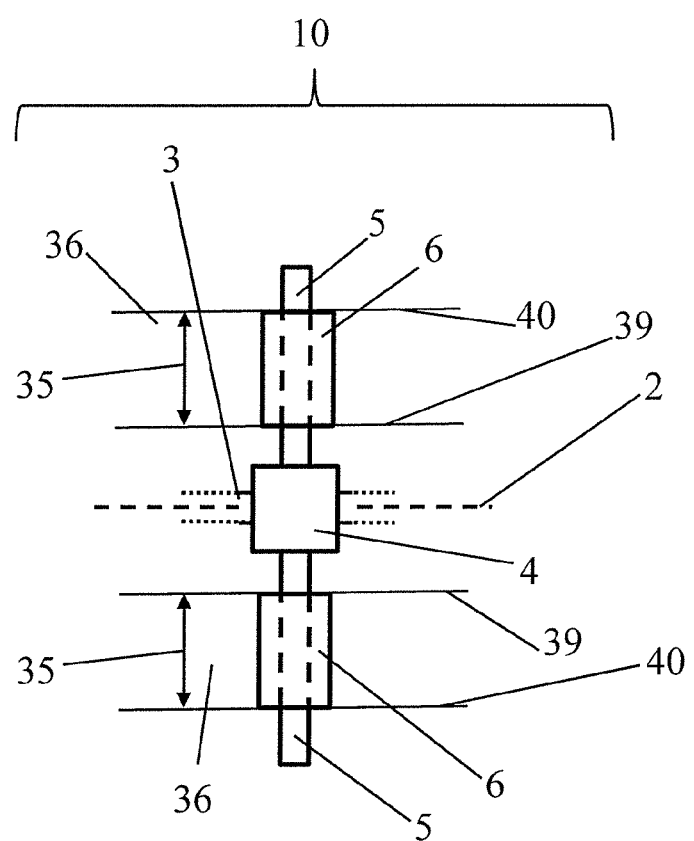
Figure 3:
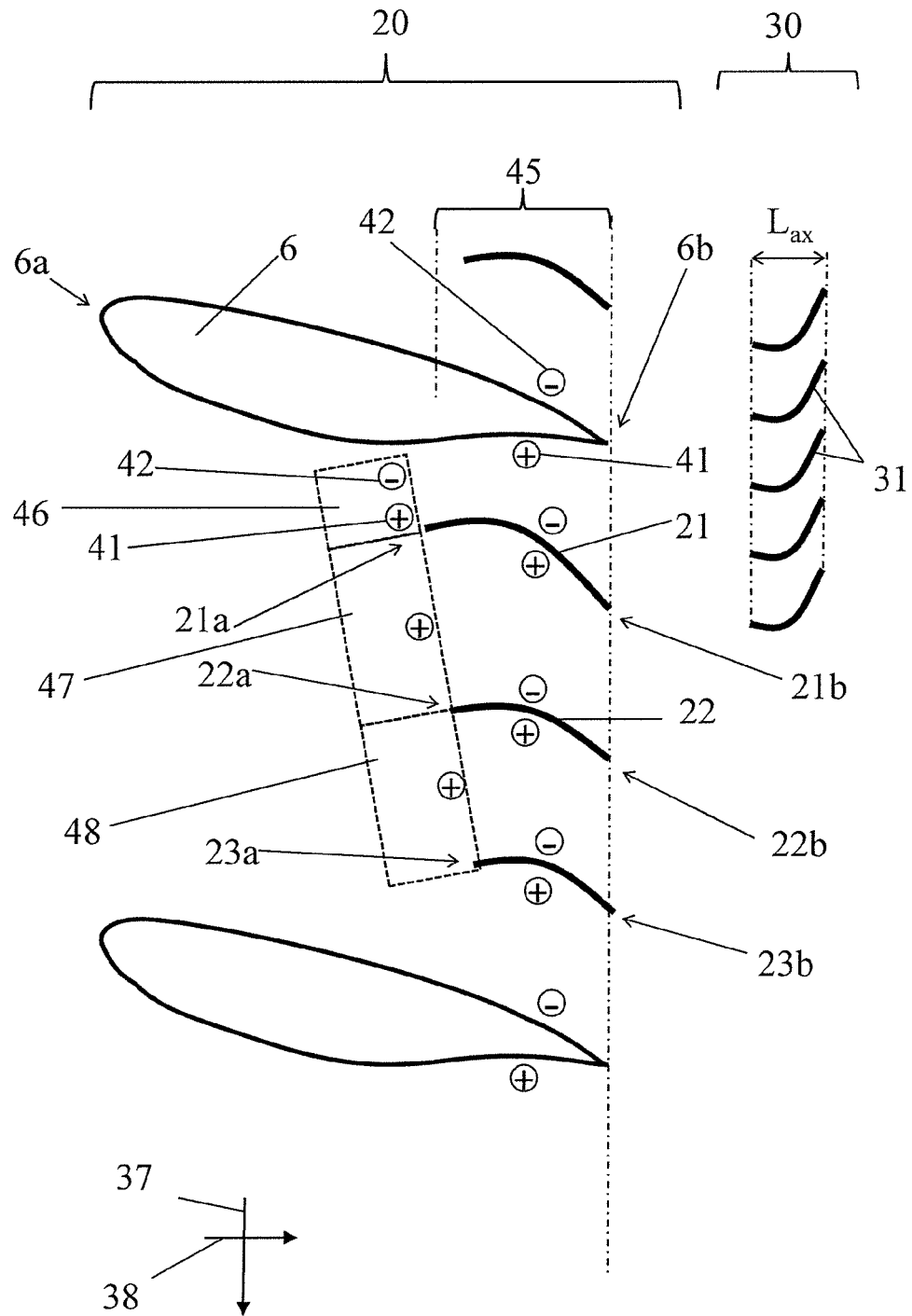

Shown in detail are:

FIG. 1 a jet engine in a sectional cut;

FIG. 2 a schematic detail view relative to FIG. 1;

FIG. 3 an arrangement of flow bypass structures according to the invention in a mid turbine frame of the jet engine in accordance with FIG. 1.

DESCRIPTION OF THE INVENTION

FIG. 1 shows a turbomachine 1 in section, specifically a jet engine. FIG. 2 shows a schematic detail view therefor; the following remarks relate to both figures. The turbomachine 1 is divided functionally into compressor 1a, combustion chamber 1b, and turbine 1c. Both the compressor 1a and the turbine 1c are each composed of a plurality of components or stages; as a rule, each stage is composed of a guide vane ring and a rotating blade ring. In operation, the rotating blade rings rotate around the longitudinal axis 2 of the turbomachine 1. The turbine shaft 3 is guided in a bearing 4, which is held by support struts 5 (partly shown by dotted lines) in the remaining turbomachine 1. In the region of the hot gas duct, each of the support struts 5 is clad for aerodynamic and also for thermal reasons, namely, by a first flow bypass structure 6, which represents a cladding and is also referred to as a fairing. This turbine module 10 is a so-called mid turbine frame. In the turbomachine 1 according to the invention, said mid turbine frame is formed integrally with the guide vane ring that follows it.

FIG. 3 shows, as a part of the turbine module 10, an arrangement with the first (thick) flow bypass structure 6, together with a second flow bypass structure 21, a third flow bypass structure 22, and a fourth flow bypass structure 23. The second, third, and fourth flow bypass structures 21, 22, and 23 are each formed as deflecting blades with a suction side (at the top in the figure) and a pressure side (at the bottom in the figure). The profile thickness of these thin deflecting blades amounts to only around 30% of the profile thickness of the first flow bypass structures 6, that is, of the fairings (in the schematic illustration in accordance with FIG. 3, the thin deflecting blades are depicted in a simplified manner as lines without profile thickness).

The flow bypass structures 6, 21, 22, 23 each have a leading edge 6a, 21a, 22a, 23a, and, downstream thereto, a respective trailing edge 6b, 21b, 22b, 23b. The leading edges 6a, 21a, 22a, 23a are increasingly displaced axially downstream, from the first flow bypass structure 6 to the second flow bypass structure 21 to the third flow bypass structure 22 to the fourth flow bypass structure 23. In the present illustration, the trailing edges 6b, 21b, 22b, 23b lie at the same axial position; however, the trailing edges 21b, 22b, 23b of the thin deflecting blades could also be displaced axially downstream relative to that of the first flow bypass structure 6. In general, the second, third, and fourth flow bypass structures 21, 22, 23 improve the bypass flow of the aerodynamically rather unfavorable first flow bypass structure 6, in particular the outflow, and thus help to improve or make uniform the inflow of the following rotor 30 (with the blading 31).

Furthermore, in accordance with the invention, a radial width 35 of the hot gas duct 36 is varied (refer to FIG. 2 in regard to the reference numbers); therefore, in any case, said radial width changes in a direction of rotation 37 and preferably also in the axial direction 38; see FIG. 3.

To this end, a hub wall surface 39, which bounds the hot gas duct 36 radially inward, and a housing wall surface 40, which bounds the hot gas duct 36 radially outward, are each formed with protuberances 41 and depressions 42. In FIG. 3, they are each drawn as circles, by way of example, but they can also have an elliptical shape and, in particular, an oblong shape. For clarity, not all protuberances (+) and depressions (−) are each furnished with their own reference numbers. In the region of a particular protuberance 41, the wall surfaces 39, 40 protrude into the hot gas duct 36 and the duct cross section is therefore narrowed. Conversely, in the region of the depressions 42, the wall surfaces 39, 40 are indented, that is, are each arched away from the hot gas duct 36, and therefore the flow cross section is enlarged.

As can be seen from FIG. 3, in the case of the thin deflecting blades, the duct is narrowed at the pressure side and widened at the suction side in each case. Also in a trailing edge region 45 of the first flow bypass structure 6, the duct is narrowed on the pressure side and widened at the suction side. Furthermore, there is a first inflow region 46, a second inflow region 47, and a third inflow region 48. The hot gas passes a respective inflow region 46, 47, 48, before it flows between the respective, circumferentially nearest-neighbor flow bypass structures. As can be seen in FIG. 3, in the first inflow region 46 at the pressure side of the first flow bypass structure 6, the duct widens, but, at the leading edge 21a of the second flow bypass structure 21, the duct narrows. Furthermore, in the second inflow region 47, the duct narrows, but then, once again, widens in the third inflow region 48. Overall, it is possible with the arrangement shown to achieve a local retardation (duct narrowed) or acceleration (duct widened) in the inflow and it is thereby possible to prevent a boundary layer convergence and high blockades at the walls 39, 40. To this end, as illustrated, the radial width 35 is expanded in regions with boundary layer convergence.

What is claimed is:

1. A turbine module for a turbomachine, comprising:
  a first flow bypass structure and a second flow bypass structure,
  said flow bypass structures being arranged in a hot gas duct, which is bounded by the turbine module and is designed to convey a hot gas and, namely, being arranged in succession in relation to a longitudinal axis of the turbine module in a direction of rotation,
  wherein, in relation to the bypass flow in the hot gas duct, the flow bypass structures each have a leading edge and, downstream of it, a trailing edge, and the second flow bypass structure is provided as a deflecting blade, wherein the second flow bypass structure has a smaller profile thickness than the first flow bypass structure,
  and wherein the hot gas duct is enclosed by a radial width that changes in relation to the longitudinal axis of the turbine module in the direction of rotation.

2. The turbine module according to claim 1, in which the radial width of the hot gas duct changes in the direction of rotation by an amount of at least 2% and not more than 8% in relation to a mean value of the radial width formed at the same axial position over a complete rotation.

3. The turbine module according to claim 1, in which a housing wall surface of the turbine module, which bounds the hot gas duct radially outward, is formed with a radial protuberance and/or a radial depression.

4. The turbine module according to claim 1, in which a hub wall surface of the turbine module, which bounds the hot gas duct radially inward, is formed with a radial protuberance and/or a radial depression.

5. The turbine module according to claim 1, in which the second flow bypass structure, which is provided as a deflecting blade, has a suction side and a pressure side, wherein the radial width of the hot gas duct is greater at the suction side of the second flow bypass structure than at the pressure side of the second flow bypass structure.

6. The turbine module according to claim 1, in which the first flow bypass structure has a suction side and a pressure side, wherein, in a trailing edge region of the first flow bypass structure, the radial width of the hot gas duct at the suction side of the first flow bypass structure is greater than at the pressure side of the first flow bypass structure.

7. The turbine module according to claim 6, in which the trailing edge region lies between 70% and 100% of an axial length of the first flow bypass structure, taken in the direction downstream.

8. The turbine module according to claim 1, in which the first flow bypass structure is arranged at the suction side of the second flow bypass structure, and a first part of the hot gas, which flows between the first flow bypass structure and the second flow bypass structure, which is circumferentially the nearest neighbor thereto, passes a first inflow region upstream, which lies at a pressure side wall of the first flow bypass structure and the leading edge of the second flow bypass structure, wherein the radial width of the hot gas duct is greater in the first inflow region at the pressure side wall of the first flow bypass structure than at the leading edge of the second flow bypass structure.

9. The turbine module according to claim 1, having a third flow bypass structure, is provided as a deflecting blade with a suction side and a pressure side and has a smaller profile thickness than the first flow bypass structure, wherein the third flow bypass structure is arranged at the pressure side of the second flow bypass structure and the first flow bypass structure is arranged at the suction side of the second flow bypass structure.

10. The turbine module according to claim 9, in which the radial width of the hot gas duct is greater at the suction side of the third flow bypass structure than at the pressure side of the third flow bypass structure.

11. The turbine module according to claim 9, in which a second part of the hot gas, which flows between of the second flow bypass structure and the third flow bypass structure, passes a second inflow region upstream, in which the radial width of the hot gas duct is smaller than a mean value of the radial width that is formed at the same axial position over a complete rotation.

12. The turbine module according to claim 9, having a fourth flow bypass structure is provided as a deflecting blade with a suction side and a pressure side and has a smaller profile thickness than the first flow bypass structure and is arranged at the pressure side of the third flow bypass structure, wherein the radial width of the hot gas duct is greater at the suction side of the fourth flow bypass structure than at the pressure side of the fourth flow bypass structure.

13. The turbine module according to claim 12, in which a third part of the hot gas, which flows between the third flow bypass structure and the fourth flow bypass structure, passes a third inflow region upstream, in which the radial width of the hot gas duct is smaller than a mean value of the radial width, which is formed at the same axial position over a complete rotation.

14. The turbine module according to claim 1, wherein the turbine module is configured and arranged in a jet engine.

15. The turbine module according to claim 1, wherein the hot gas flows through the hot gas duct.

* * * * *